(12) United States Patent
Okusawa et al.

(10) Patent No.: US 8,277,996 B2
(45) Date of Patent: Oct. 2, 2012

(54) FUEL CELL

(75) Inventors: Tsutomu Okusawa, Hitachi (JP); Masaya Kozakai, Hitachi (JP); Hidekazu Fujimura, Mito (JP); Ko Takahashi, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 1402 days.

(21) Appl. No.: 11/845,955

(22) Filed: Aug. 28, 2007

(65) Prior Publication Data

US 2008/0081239 A1 Apr. 3, 2008

(30) Foreign Application Priority Data

Sep. 28, 2006 (JP) ................................. 2006-263714

(51) Int. Cl.
*H01M 8/04* (2006.01)
*H01M 8/10* (2006.01)
(52) U.S. Cl. ....................................... 429/437; 429/483
(58) Field of Classification Search ............ 429/456–45, 429/512, 514, 507, 408, 416, 428, 433–434, 429/437, 120, 483, 438–439; 204/274, 277
See application file for complete search history.

(56) References Cited

U.S. PATENT DOCUMENTS

| | | | | |
|---|---|---|---|---|
| 3,917,520 A * | 11/1975 | Katz et al. | ..................... | 205/349 |
| 6,165,634 A * | 12/2000 | Krasij et al. | ................... | 429/434 |
| 6,924,052 B2 * | 8/2005 | Lee | ............................... | 429/434 |
| 2002/0132148 A1 * | 9/2002 | Panik | ............................. | 429/19 |
| 2003/0039875 A1 * | 2/2003 | Horiguchi et al. | ............... | 429/26 |

FOREIGN PATENT DOCUMENTS

| | | |
|---|---|---|
| JP | 08306371 A * | 11/1996 |
| JP | 2005-235727 | 9/2005 |

OTHER PUBLICATIONS

Machine Translation and Abstract in English of JP 08-306371.*

* cited by examiner

*Primary Examiner* — Barbara Gilliam
*Assistant Examiner* — Claire L Roe
(74) *Attorney, Agent, or Firm* — Antonelli, Terry, Stout & Kraus, LLP.

(57) ABSTRACT

A fuel cell according to the present invention comprises a membrane electrode assembly, a bipolar plate for guiding a reaction gas to the membrane electrode assembly, two layers of coolant flow fields formed on the bipolar plane opposite to another plane on which a reaction gas flow field is formed, and an interlayer separation plate; wherein the interlayer separation plate separates the two layers of coolant flow fields and has permeability or jet orifices so as to allow a coolant to pass through.

14 Claims, 9 Drawing Sheets

VIEWED FROM C-C

VIEWED FROM A-A

MAGNIFIED VIEW

VIEWED FROM B-B

MAGNIFIED VIEW

FUEL CELL

CLAIM OF PRIORITY

The present application claims priority from Japanese application serial no. 2006-263714 filed on Sep. 28, 2006, the content of which is hereby incorporated by reference into this application.

BACKGROUND OF THE INVENTION

1. Field of the Invention

The present invention relates to a polymer electrolyte fuel cell.

2. Description of Related Art

In order to obtain a fuel cell with a high power density, it is efficient that components and/or regions in the fuel cell without direct contribution to power generation are trimmed down as possible so as to reduce the entire volume of the fuel cell. It is considered that reducing the amount of coolant in a fuel cell is one of possible means to satisfy above requirement. As described in JP-A-2005-235727, there is a method to reduce the amount of coolant by utilizing a latent heat cooling instead of a sensible heat cooling. The latent heat cooling utilizes the heat of vaporization of coolant, and the sensible heat cooling utilizes the specific heat of coolant. In the latent heat cooling, 2% of the amount of coolant used in the sensible heat cooling is enough theoretically to obtain a comparable cooling effect.

For effective latent heat cooling, it makes the coolant be fine droplets to increase a surface area per unit volume of the coolant so as to facilitate vaporization. Moreover, the generated fine droplets of coolant are carried to a cooling place and made to hit against a member to be cooled. A gas can carry the fine droplets of coolant because the settling rate of the fine droplets is extremely low in the gas. However, at a bent portion of a pipe or another place where the acceleration works on a fluid to bend, the fine droplets of coolant are easy to separate from the carrier gas, thereby hitting against the pipe wall. As a result, there is a problem that the coolant is wasted at places where cooling is not needed.

Furthermore, the reaction gas before a power generation reaction in a fuel cell usually includes water vapor. The vapor pressure is already near the saturated vapor pressure. Thus, even though the fine droplets of coolant are added to the reaction gas, it is difficult to vaporize due to the saturated vapor pressure, thereby decreasing the cooling effect. In addition, there is a problem that excessive moisture makes it difficult to remove water generated by the cell reaction.

By the way, in a fuel cell, hydrogen is used as an anode gas (referred to below as the AN gas) and oxygen in the air is used as a cathode gas (referred to below as the CA gas). These gases are consumed as in a chemical equation below, generating water, heat and electric power.

$$2H_2+O_2 \rightarrow 2H_2O+(heat)+(electric\ power)$$

This reaction occurs during a flow from the upstream to the downstream along the flow fields in a fuel cell, so the reaction gas is consumed as the flow proceeds. While, water vapor generated by a cell reaction flows into the CA gas; and also water flows to the AN gas side on the basis of diffusion and electroosmosis, thereby increasing the water vapor concentration in the both sides (cathode and anode). When the water vapor exceeds the saturated concentration, condensed water generates and is easy to block the flow field. This condensed water then causes insufficiency of the reaction gas and flooding, thereby lowering the cell voltage and shortening a life of the cell.

Furthermore, the condensed water releases latent heat and thereby a temperature of the fuel cell rises locally (uneven temperature distribution occurs). In order to protect the membrane electrode assembly (MEA), however, the maximum temperature must be limited; therefore fuel utilization ratio should be controlled to lower. As a result, the output of the entire cell decreases.

On the contrary, in order to provide a fuel cell with a high power density and a low cost, it is desirable to raise the fuel utilization ratio to almost 100%. It is also desirable to reduce the regions such as manifolds of a separator and other parts without direct contribution to power generation so as to reduce the entire volume. In order to achieve above conditions, it is necessary that cooling performance is improved and that a uniform temperature distribution is attained. Moreover, it is also important to suppress a flooding phenomenon.

SUMMARY OF THE INVENTION

Under these circumstances, it is an object of the present invention to provide a fuel cell that has a cooling efficiency higher than the cooling efficiencies of the conventional fuel cells. It is further object of the present invention to provide a fuel cell that has a uniform temperature distribution. It is further object of the present invention to provide a fuel cell that can suppress a flooding phenomenon.

According to an aspect of the present invention, a fuel cell comprises a membrane electrode assembly, a bipolar plate for guiding a reaction gas to the membrane electrode assembly, a first coolant flow field adjacent to the bipolar plate, a second coolant flow field, and a member having permeability or a jet orifice so as to allow a coolant to pass through; wherein the member is disposed between the first and the second coolant flow fields.

In a fuel cell in a preferred embodiment of the present invention, fine droplets of coolant are generated through coolant jet orifices of a interlayer separation plate into a first coolant flow field by flowing a pressured coolant in a second coolant flow field. The resulting latent heat due to vaporization of the fine droplets of coolant is used for cooling the fuel cell. Furthermore, although there is no restriction on the coolant in the present invention, it is preferable to use water as a coolant in the viewpoint of cost reduction.

ADVANTAGES OF THE INVENTION

According to the present invention, it is possible to provide a fuel cell that has a high cooling efficiency by utilizing the latent heat cooling, thereby reducing the amount of coolant and entire volume of the fuel cell than in the case of the sensible heat cooling. Furthermore, it is possible to provide a fuel cell that has a compact size, thereby also reducing an auxiliary device power. Furthermore, it is possible to provide a fuel cell with a high cooling efficiency, which enables to increase the fuel utilization ratio. Accordingly, the fuel cell can perform high power operation.

DETAILED DESCRIPTION OF THE PREFERRED EMBODIMENTS

Preferred embodiments of the present invention will be described below with reference to the drawings. However, the present invention is not limited to the embodiments described herein.

[First Embodiment]

Figure 1:
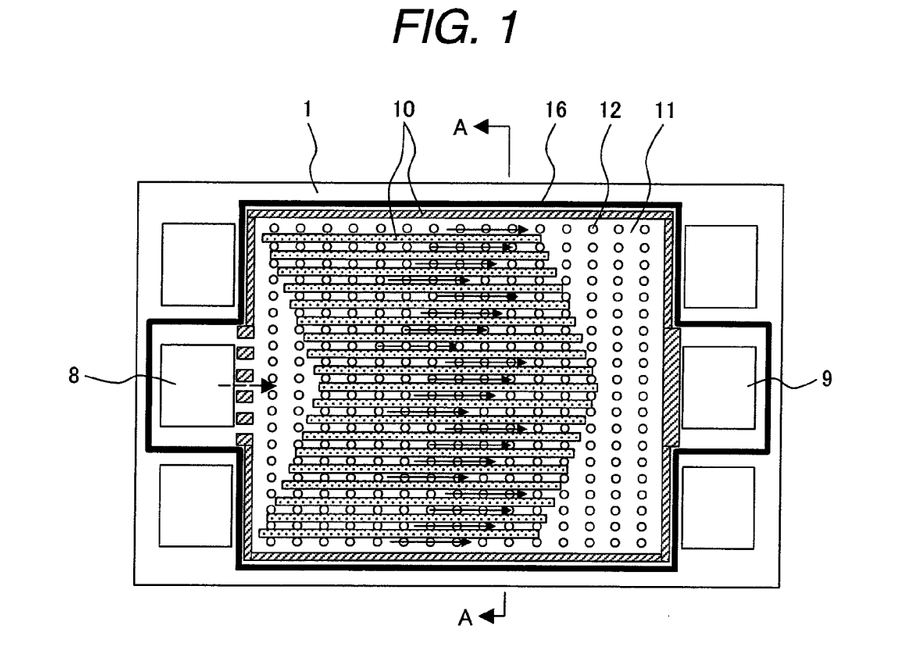
FIG. 1 is a schematic illustration showing a plan view of a second coolant flow field and a bipolar plate in a fuel cell according to a first embodiment of the present invention.
Figure 2:
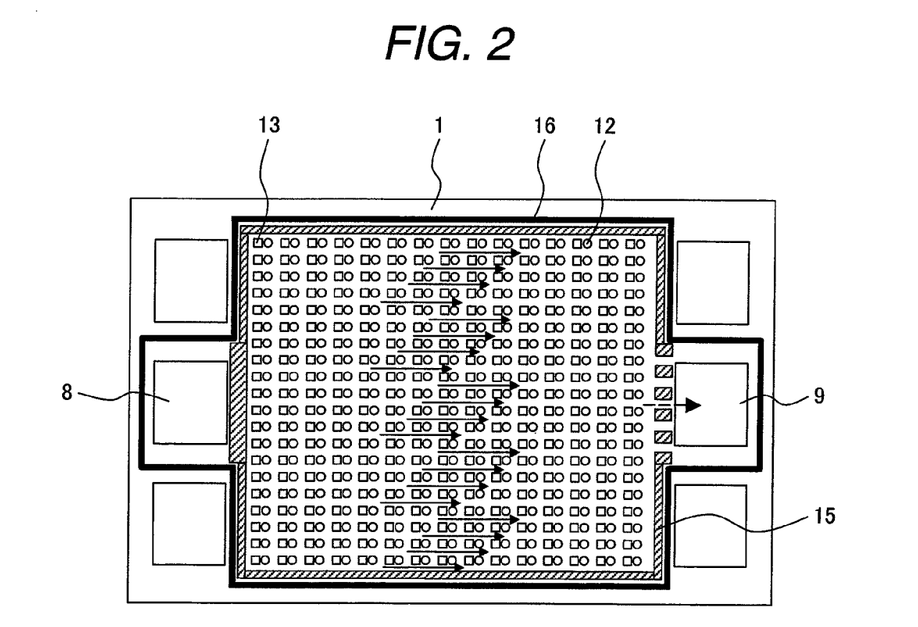
FIG. 2 is a schematic illustration showing a plan view of a first coolant flow field and the bipolar plate in the fuel cell according to the first embodiment of the present invention.
Figure 3:
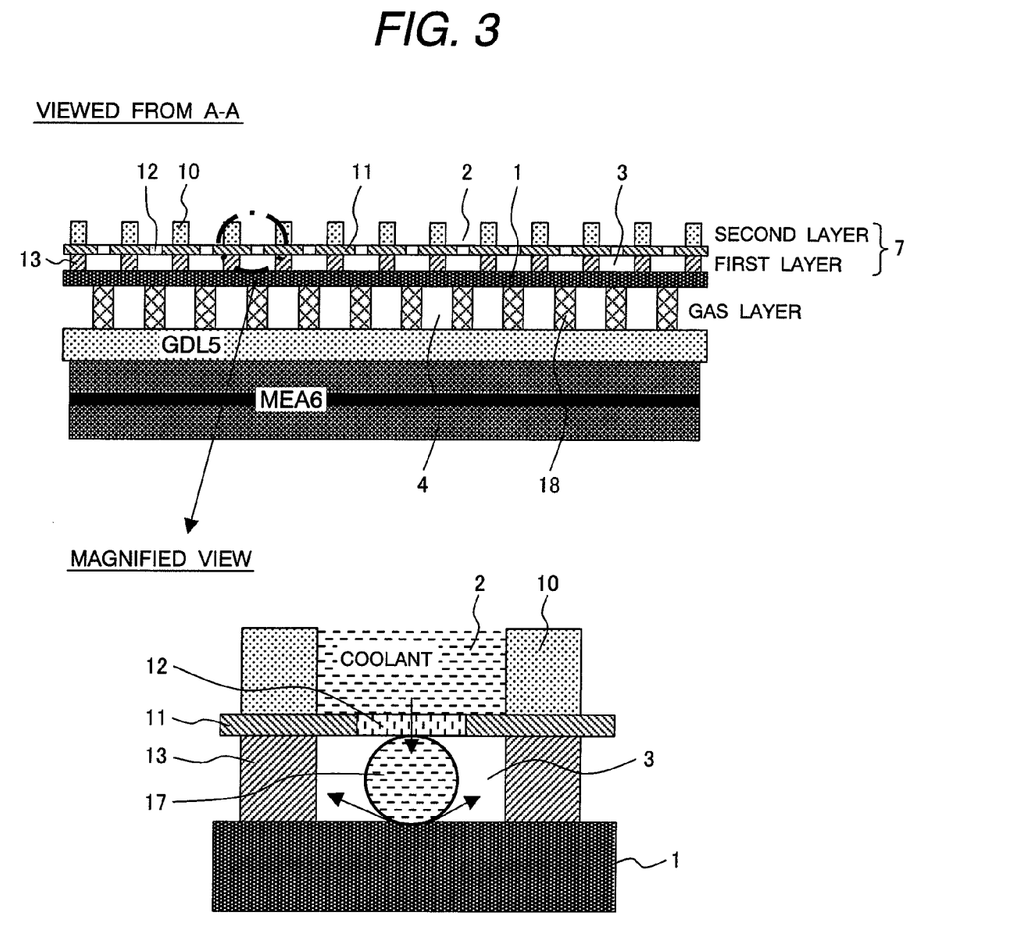
FIG. 3 is a schematic illustration showing a cross sectional view cutting along A-A line in FIG. 1 as well as a partial magnified view of the cross section.

FIG. 1 is a schematic illustration showing a plan view of a second coolant flow field 2 and a bipolar plate 1 in a fuel cell according to a first embodiment of the present invention; and FIG. 2 is a schematic illustration showing a plan view of a first coolant flow field 3 and the bipolar plate 1 in the fuel cell according to the first embodiment. The first coolant flow field 3 of two layers of coolant flow fields is adjacent to the bipolar plate 1; and the second coolant flow field 2 is far from the bipolar plate 1. In FIG. 2, a coolant jet orifice 12, which is invisible in practice, is indicated to clarify the positional relation between the coolant jet orifice 12 and a flow control block 13. FIG. 3 is a schematic illustration showing a cross sectional view cutting along A-A line in FIG. 1 as well as a partial magnified view of the cross section. FIG. 3 shows the relationship among components shown in FIGS. 1 and 2, a reaction gas flow field 4, a gas diffusion layer (GDL) 5, and a membrane electrode assembly (MEA) 6. However, in order to simplify below explanation and indicate individual members in the drawing, the positions of the coolant jet orifices 12 and the positions of the flow control blocks 13 are mutually displaced. The magnified view is a partial magnified cross sectional view of a portion indicated by a dot-dash circle in a jet cooling device 7 comprising two layers of coolant flow fields. As shown in FIG. 3, the bipolar plate 1 is a plate made of a dense solid material, which is adjacent to the GDL 5 with reaction gas flow guide walls 18. The reaction gas may be the AN gas or the CA gas in FIG. 3. The reaction gas flow field 4 is formed between the bipolar plate 1 and the GDL 5; the bipolar plate 1 supports the jet cooling device 7 and the reaction gas flow guide walls 18. The jet cooling device 7 has a two-layer structure comprising the second coolant flow field 2 and first coolant flow field 3 separated by an interlayer separation plate 11.

As shown in FIG. 1, the bipolar plate 1 has inlet manifolds for the CA gas, AN gas, and coolant to be distributed into cells and also includes outlet manifolds. Of these manifolds, a coolant inlet manifold 8 and a coolant outlet manifold 9 relate to the jet cooling device 7 used for latent heat cooling; the coolant inlet manifold distributes the coolant for each cell, and the coolant outlet manifold collects and discharges the coolant distributed and then used for heat removal. Flow field guide walls 10 are disposed in the second coolant flow field 2 to equalize the flow of the coolant and to reduce a coolant flow to the vicinity of a seal 16. Formed in the interlayer separation plate 11 are coolant jet orifices 12 through which the coolant is jetted into the first coolant flow field 3. In the second coolant flow field, a flow field connecting to the coolant outlet manifold 9 is blocked by part of the flow field guide walls 10, as shown in FIG. 1.

On the other hand, as shown in FIG. 2 of the first coolant flow fields 3, many flow control blocks 13 are provided upstream of the coolant jet orifices 12, instead of the flow field guide walls 10 disposed in the second coolant flow fields 2. In the first coolant flow field 3, part of flow field guide walls 15 blocks the coolant inlet manifold 8. The seal 16 is attached to the same bipolar plate 1, and seal the two layers (the first and second coolant flow fields) together. In order to facilitate fine coolant droplets' movement and evaporation, the coolant jet orifice 12 is preferably designed so that the diameters of the fine coolant droplets are 30 μm or less.

Next, the cooling process will be described. The coolant supplied from the coolant inlet manifold 8 is controlled by the flow field guide walls 10 and expands in the second coolant flow field 2. Since the coolant outlet manifold 9 is blocked, the coolant passes through the coolant jet orifices 12, and is jetted into the first coolant flow field 3, generating coolant droplets 17. The coolant droplets 17 then hit against the bipolar plate 1 and absorb the heat of the bipolar plate 1; and part of the coolant droplets 17 evaporates. A resulting mixed fluid of coolant and coolant vapor is ejected to the coolant outlet manifold 9, which is not blocked. In this case, the flow control blocks 13 arrange the flow so that the mixed fluid of coolant and coolant vapor proceeding to the coolant outlet manifold 9 does not disturb the hitting of other coolant droplets against the bipolar plate 1 and their evaporation. The flow control block 13 also functions as a fin for increasing the actual surface area (heat transfer area) of the bipolar plate 1.

According to Heat Transfer Engineering Handbook (Dennetsu-Kogaku-Binran, in Japanese), when water is used as a coolant, it is usually expected that a heat transfer coefficient increases to five to ten times in coolant droplet cooling with the same amount of coolant.

In the structure as described above, the amount of coolant can be reduced to 10 to 20%, as compared with the conventional sensible heat cooling, so the size of the coolant manifold can be reduced. Accordingly, the polymer electrolyte fuel cell can be made compact and have a high power density, and the auxiliary device in the cooling system can be also made compact.

[Second Embodiment]

Figure 4:
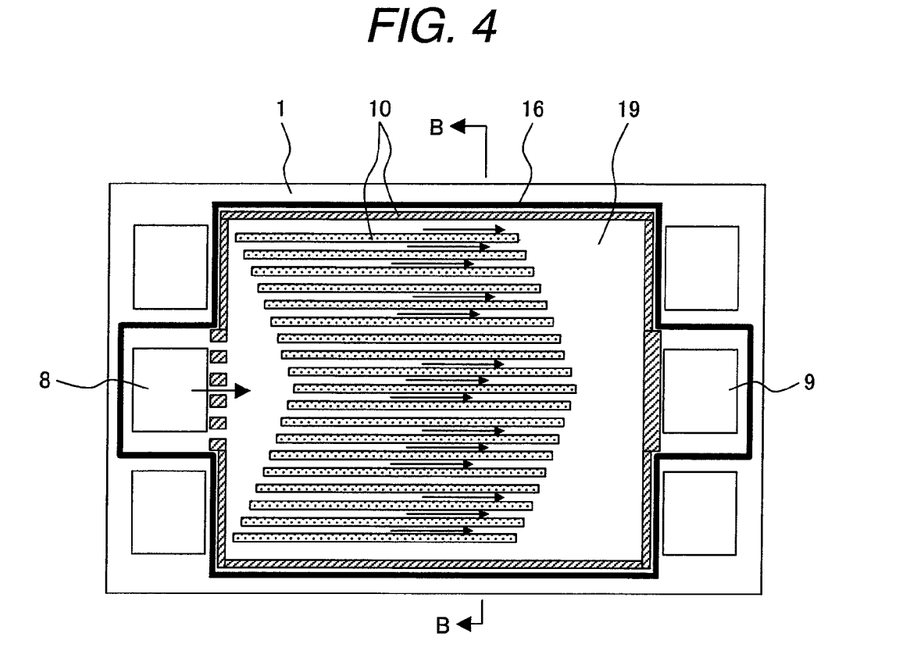
FIG. 4 is a schematic illustration showing a plan view of a second coolant flow field and a bipolar plate in a fuel cell according to a second embodiment of the present invention.
Figure 5:
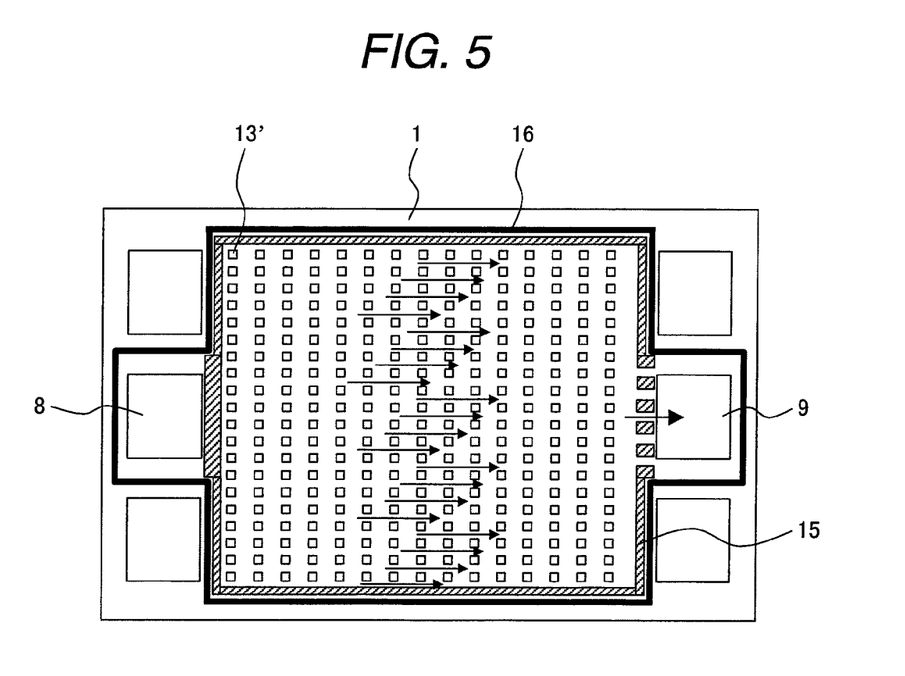
FIG. 5 is a schematic illustration showing a plan view of a first coolant flow field and the bipolar plate in the fuel cell according to the second embodiment of the present invention.
Figure 6:
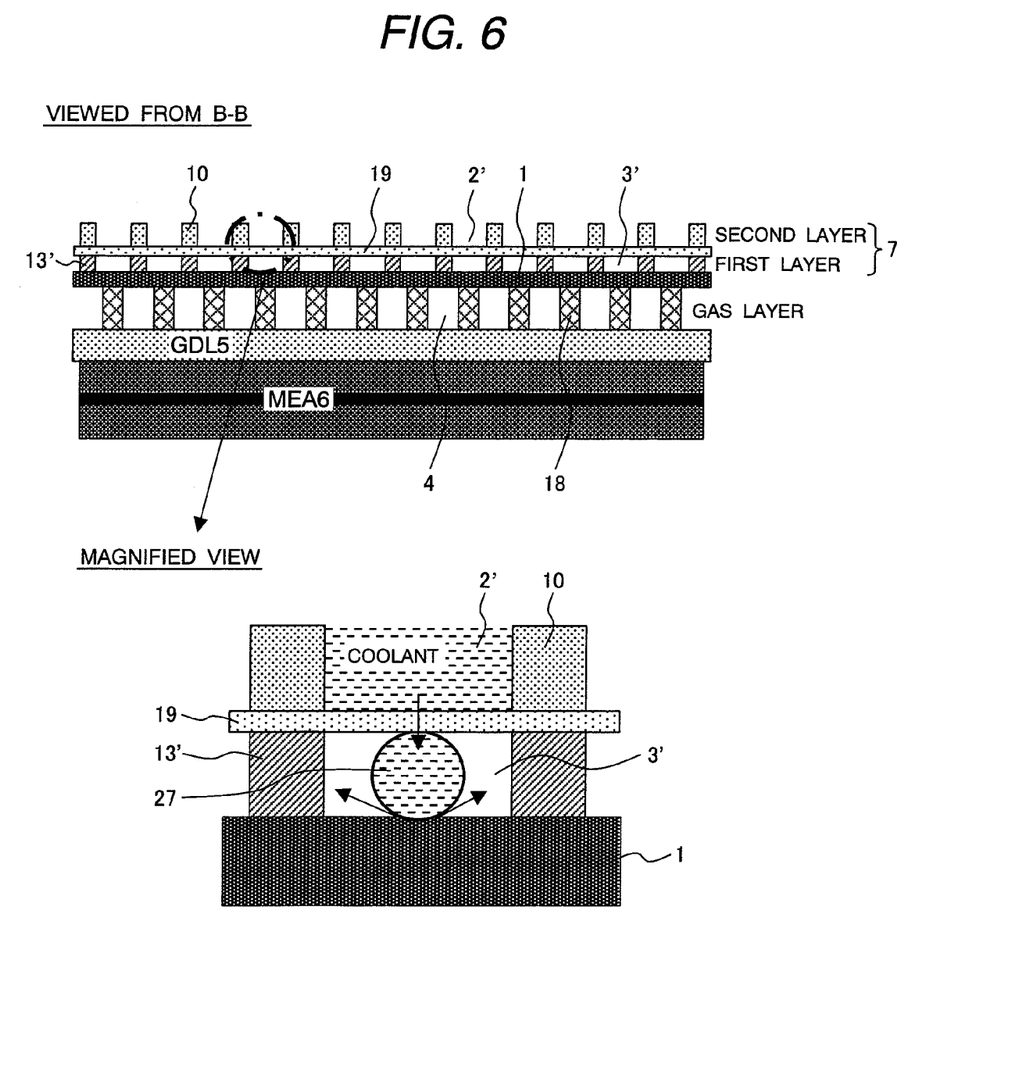
FIG. 6 is a schematic illustration showing a cross sectional view cutting along B-B line in FIG. 4 as well as a partial magnified view of the cross section.

FIG. 4 is a schematic illustration showing a plan view of a second coolant flow field 2' and a bipolar plate 1 in a fuel cell according to a second embodiment of the present invention. FIG. 5 is a schematic illustration showing a plan view of a first coolant flow field 3' and the bipolar plate 1 in the fuel cell according to the second embodiment. FIG. 6 is a schematic illustration showing a cross sectional view cutting along B-B line in FIG. 4 as well as a partial magnified view of the cross section. This embodiment differs from the first embodiment in that a porous interlayer separation plate 19 is used instead of the interlayer separation plate 11 made of a dense solid material and that the coolant jet orifices 12 are eliminated. Alternatively, the porous material of the porous interlayer separation plate 19 has an average pore diameter of about 30 μm. The porous interlayer separating plate 19 has preferably undergone a water-repellent treatment. The coolant passes through the pores that are randomly distributed, is jetted by the coolant pressure, and appears as a coolant droplet 27 in the first coolant flow field 3'. The coolant droplet is easily separated from the porous interlayer separation plate 19 due to the water-repellent treatment and hits against the bipolar plate 1, thereby cooling the bipolar plate 1. Concurrently, a part of coolant vaporizes directly from the porous interlayer separation plate 19, so the bipolar plate 1 can be also cooled indirectly through the flow control blocks 13'.

The above structure of the second embodiment further improves the cooling effect of the fuel cell entirely as compared with the first embodiment. In addition, the amount of coolant used can be further reduced.

[Third Embodiment]

Figure 7:
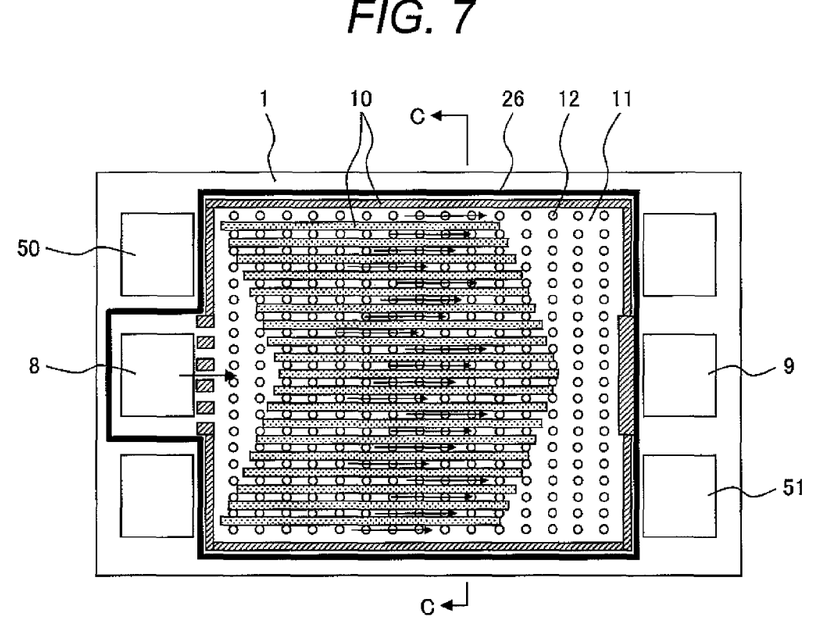
FIG. 7 is a schematic illustration showing a plan view of a second coolant flow field and a bipolar plate in a fuel cell according to a third embodiment of the present invention.
Figure 8:
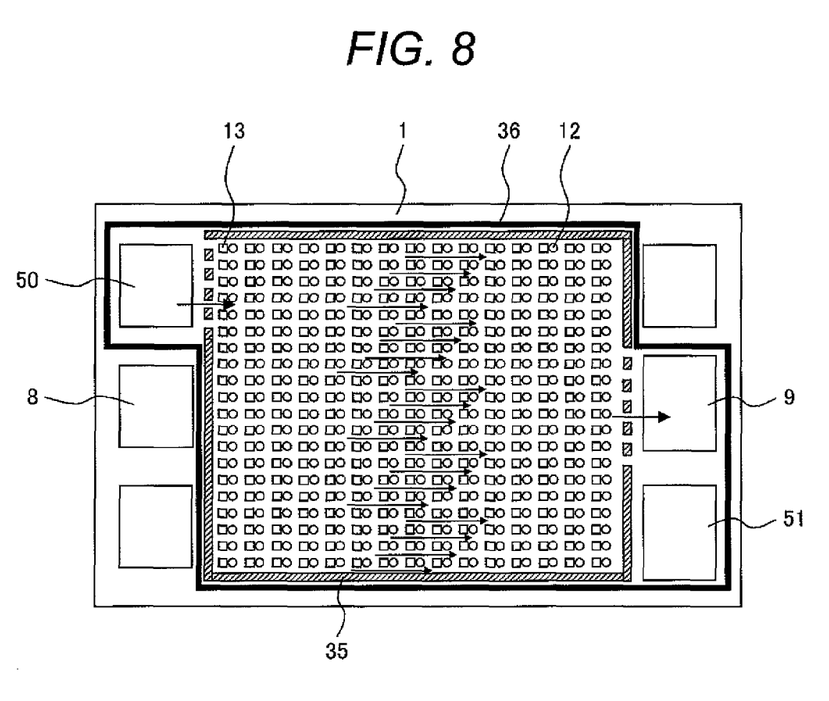
FIG. 8 is a schematic illustration showing a plan view of a first coolant flow field and the bipolar plate in the fuel cell according to the third embodiment of the present invention.
Figure 9:
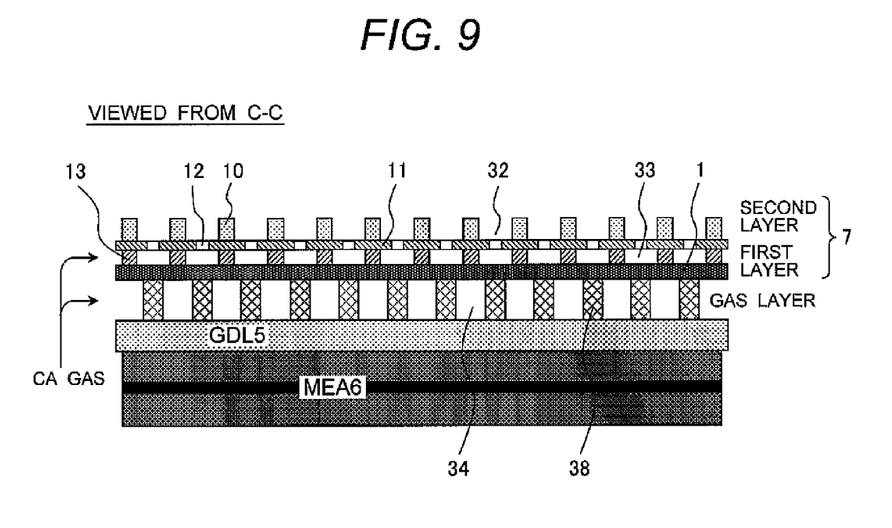
FIG. 9 is a schematic illustration showing a cross sectional view cutting along C-C line in FIG. 7.

FIG. 7 is a schematic illustration showing a plan view of a second coolant flow field 32 and a bipolar plate 1 in a fuel cell according to a third embodiment of the present invention. FIG. 8 is a schematic illustration showing a plan view of a first coolant flow field 33 and the bipolar plate 1 in the fuel cell according to the third embodiment. FIG. 9 is a schematic illustration showing a cross sectional view cutting along C-C line in FIG. 7. Furthermore, in order to assist understanding of features in this embodiment, the CA gas to be supplied is indicated expediently by using arrows in FIG. 9 (of course, the CA gas does not flow in the directions of the arrows). And also, only a seal that determines each flow field is described in each figure for easy understanding. This embodiment mainly differs from the first embodiment in that part of the CA gas is introduced into the first coolant flow fields 33. Therefore, the cooling effect is enhanced by active ejection of the coolant.

As shown in FIG. 7, the second coolant flow fields 32 are separated from a coolant outlet manifold 9 by a seal 26. Accordingly, the coolant supplied from a coolant inlet manifold 8 fills the second coolant flow fields 32; after that the coolant is jetted to the first coolant flow fields 33 through a plurality of jet orifices 12.

On the other hand, as shown in FIG. 8, a seal 36 seals a CA gas inlet manifold 50 on the left side in the drawing as well as the coolant outlet manifold 9 and a CA gas outlet manifold 51 on the right side.

In the first coolant flow field 33, a flow field guide wall 35 guides the coolant and the CA gas to the coolant outlet manifold 9 and the CA gas outlet manifold 51, respectively.

Figure 10:
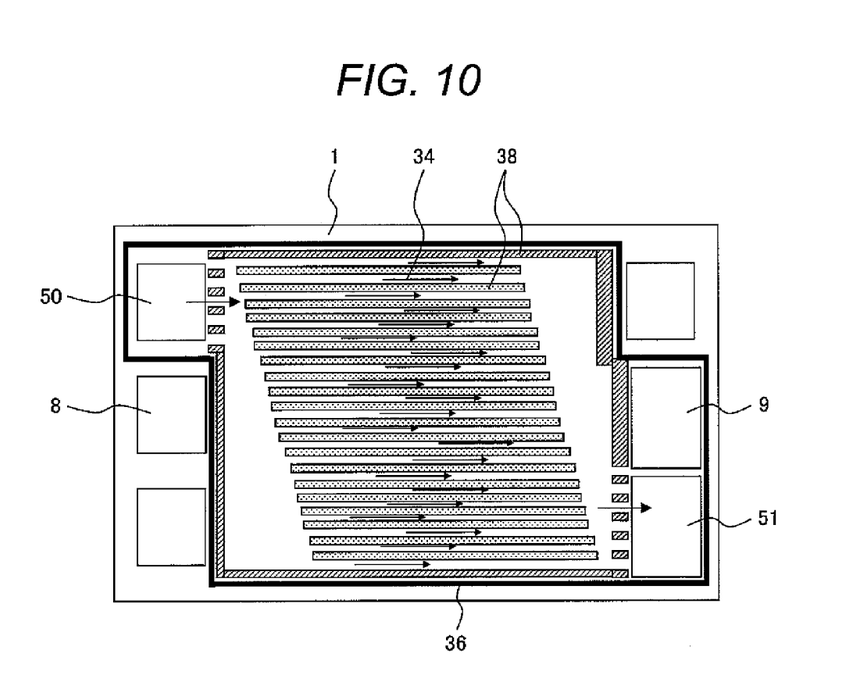
FIG. 10 is a schematic illustration showing a transparent plan view of a reaction gas flow field and the bipolar plate of the fuel cell according to the third embodiment of the present invention.

FIG. 10 is a schematic illustration showing a transparent plan view of a reaction gas flow field 34 and the bipolar plate 1 of the fuel cell according to the third embodiment of the present invention. In order to facilitate understanding of the positional relationship between FIGS. 7, 8 and 10, FIG. 10 is drawn perspectively as viewed from FIGS. 7 and 8 (when the reaction gas flow field 34 is viewed from the MEA 6 side, the right and left sides in FIG. 10 should be inverted). A gas layer (the reaction gas flow field 34, reaction gas flow guide walls 38 and so on) is formed between the bipolar plate 1 and the GDL 5. The reaction gas flow field 34 is controlled by the reaction gas flow guide walls 38 (see FIG. 9). In this gas layer, the CA gas introduced from the CA gas inlet manifold 50 is guided to the CA gas outlet manifold 51.

As mentioned above, the coolant supplied from the coolant inlet manifold 8 fills the second coolant flow field 32, enters into the first coolant flow field 33 through the plurality of jet orifices 12, and hits against the bipolar plate 1 so that cooling is carried out. Concurrently, the CA gas is fed from the CA gas inlet manifold 50 into the first coolant flow field 33; and a mixed fluid of the coolant, the coolant vapor resulting from heat removal and the CA gas flows downstream. Accordingly, the mixed fluid is ejected to the coolant outlet manifold 9. At this time, the acceleration works on the mixed fluid to bend due to the positional relationship between the coolant outlet manifold 9 and the CA gas outlet manifold 51, thereby most of the coolant is discharged from the coolant outlet manifold 9. Most of the CA gas and the remaining coolant vapor are discharged from the CA gas outlet manifold 51. In the reaction gas flow field 4, the CA gas is fed from the CA gas inlet manifold 50, passes through the GDL 5, and causes an electrochemical reaction in the MEA 6. Oxygen in the CA gas is then lost; the remaining CA gas and generated water vapor due to the cell reaction flow downstream and are discharged to the CA gas outlet manifold 51.

In the structure as described above, the coolant supplied for cooling and the resulting coolant vapor can be ejected actively by part of the supplied CA gas, so the cooling effect can be further enhanced. Accordingly, the polymer electrolyte fuel cell can be made compact and have a high power density.

[Fourth Embodiment]

Figure 11:
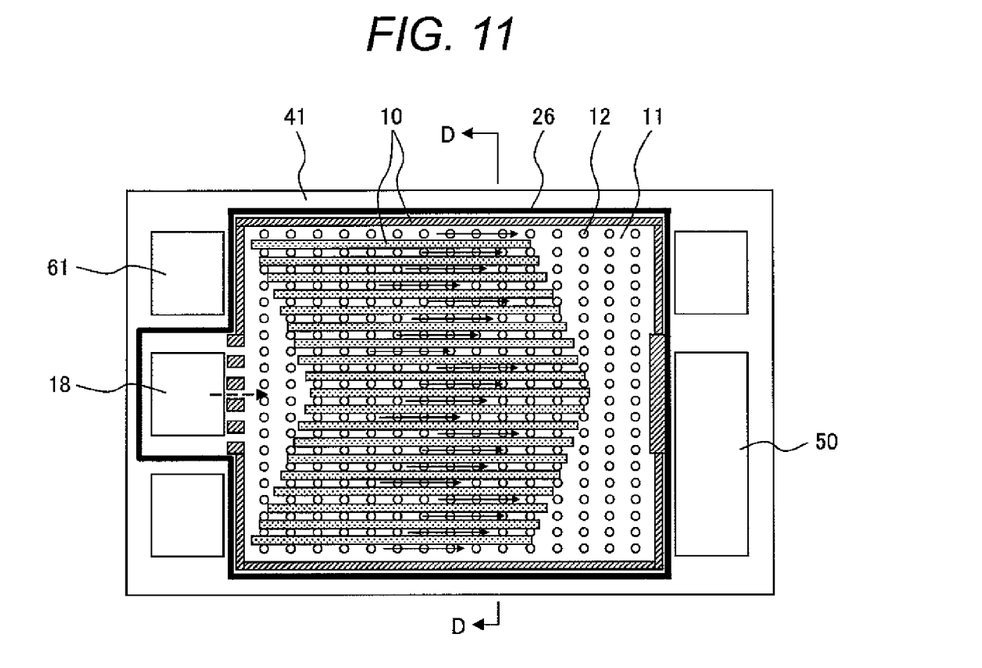
FIG. 11 is a schematic illustration showing a plan view of a second coolant flow field and a bipolar plate in a fuel cell according to a fourth embodiment of the present invention.
Figure 12:
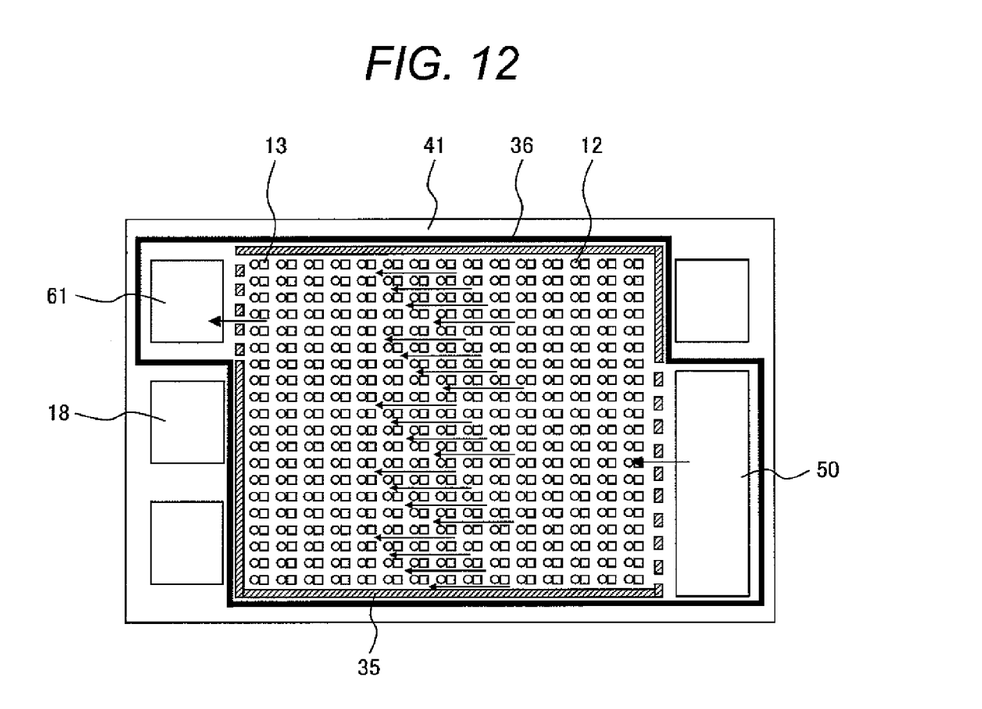
FIG. 12 is a schematic illustration showing a plan view of a first coolant flow field and the bipolar plate in the fuel cell according to the fourth embodiment of the present invention.
Figure 13:
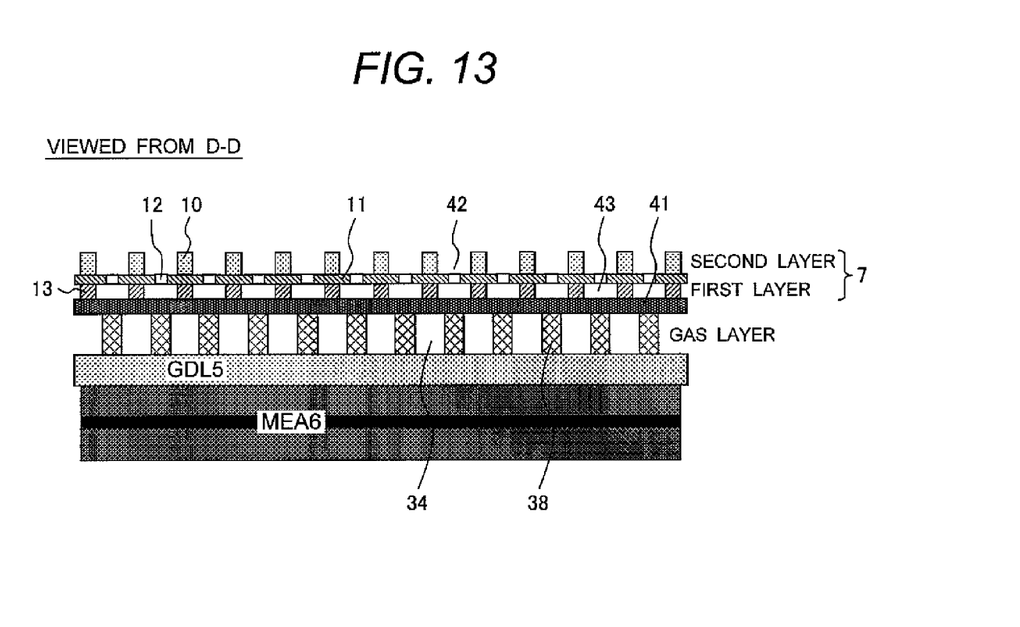
FIG. 13 is a schematic illustration showing a cross sectional view cutting along D-D line in FIG. 11.
Figure 14:
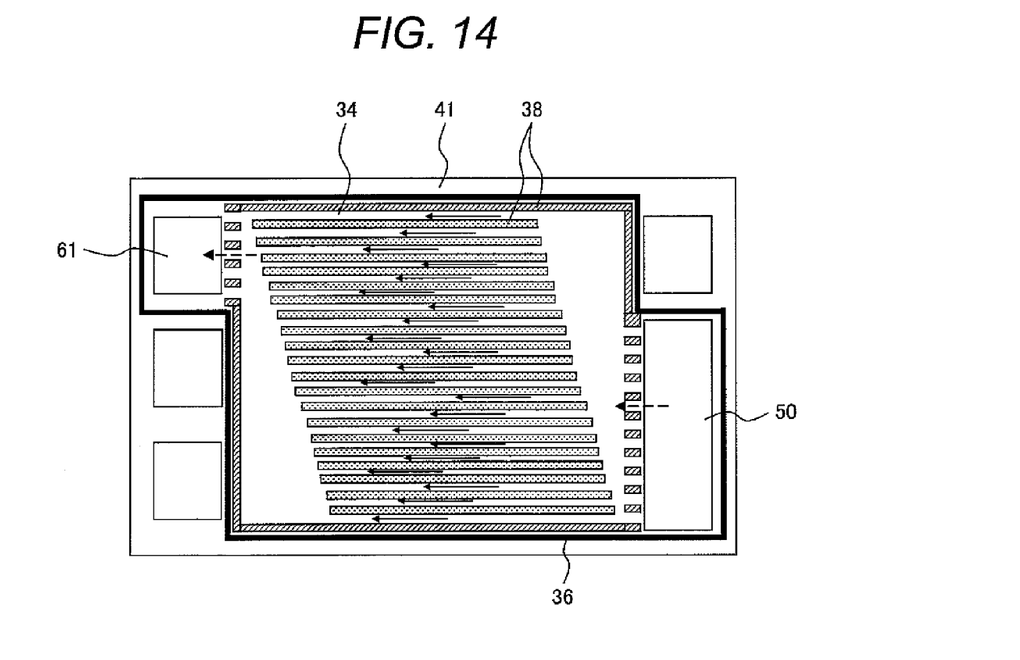
FIG. 14 is a schematic illustration showing a transparent plan view of a gas flow field in the fuel cell and the bipolar plate according to the fourth embodiment of the present invention.

FIG. 11 is a schematic illustration showing a plan view of a second coolant flow field 42 and a bipolar plate 41 in a fuel cell according to a fourth embodiment of the present invention. FIG. 12 is a schematic illustration showing a plan view of a first coolant flow field 43 and the bipolar plate 41 in the fuel cell according to the fourth embodiment. FIG. 13 is a schematic illustration showing a cross sectional view cutting along D-D line in FIG. 11. FIG. 14 is a schematic illustration showing a transparent plan view of a gas flow field in the fuel cell and the bipolar plate according to the fourth embodiment. FIG. 14 is drawn perspectively as viewed from FIGS. 11 and 12, in the same manner of FIG. 10. Furthermore, only a seal that determines each flow field is described in each figure for easy understanding.

This embodiment is a variation of the third embodiment; the direction in which the CA gas flows is opposite to that of the coolant flow in the second coolant flow field 42; and the CA gas outlet manifold 61 is commonly used for the coolant outlet manifold as shown in FIGS. 12 and 14. In this embodiment, heat exchange with the coolant in an upstream area, in which the temperature of the coolant is lowest, can be performed in a downstream area of the CA gas, in which the temperature of the CA gas is highest. Therefore, the temperature distribution in the fuel cell can be minimized.

The above structure can further improve uniformity of the temperature distribution (can suppress a local temperature rise) in the fuel cell, so it becomes possible to raise the fuel utilization ratio. Accordingly, the polymer electrolyte fuel cell can be made compact and have a high power density.

[Fifth Embodiment]

Figure 15:
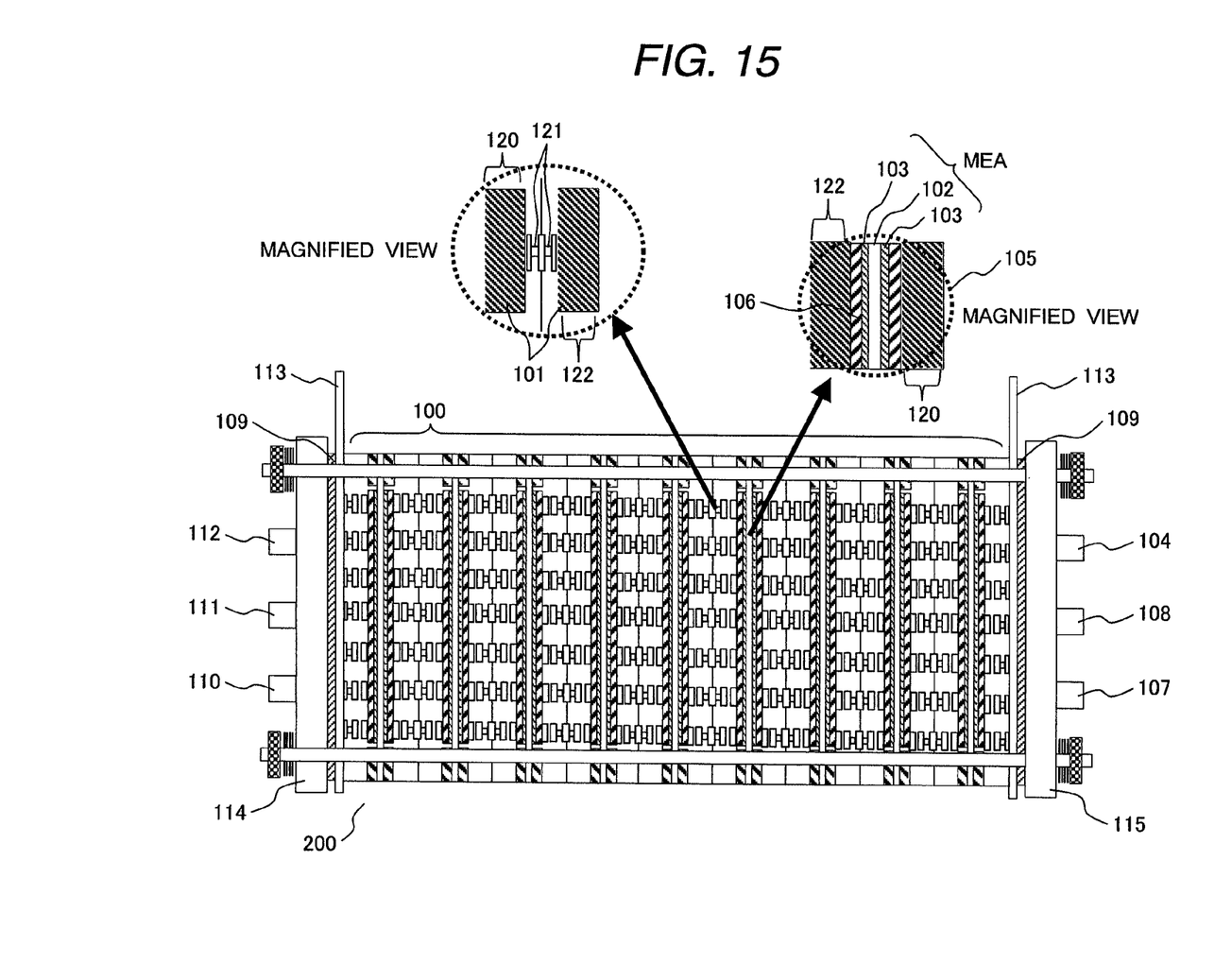
FIG. 15 is a schematic illustration showing a fuel cell according to the present invention in which the bipolar plate with two layers of coolant flow fields in any of the first, third, and fourth embodiments is stacked.

FIG. 15 is a schematic illustration showing a fuel cell 200 according to the present invention in which the bipolar plate with two layers of coolant flow fields in any of the first, third, and fourth embodiments is stacked. This embodiment can be also applied with necessary changes to the second embodiment because the second embodiment differs only in that a porous material is used instead of the coolant jet orifices.

The fuel cell 200 generally comprises current collecting plates 113 disposed at both ends of a stack 100, which externally supply current, insulating plates 109 disposed outward of the current collecting plates 113, and end plates 114 and 115 that hold both ends of the insulating plates 109. The end plate 114 has an AN gas supply port 112, a CA gas supply port 111, and a coolant supply port 110. The end plate 115 has an AN gas discharge port 104, a CA gas discharge port 108, and a coolant discharge port 107. The stack 100 comprises a plurality of unit cells, which are stacked so that jet cooling devices 121 according to the present invention face each other; and the unit cell is formed by holding a power generation portion 105 with a pair of bipolar plates 101. In the power generation portion 105, an MEA comprising an electrolyte membrane 102 and electrodes 103 is disposed between gas diffusion layers 106. The power generation portion 105 is brought into contact with an AN gas flow field 120 and a CA gas flow field 122 of the bipolar plate 101, along which hydrogen and oxygen are supplied to the power generation portion 105. Current and heat are then generated. The jet cooling devices 121 disposed at the backsides of the gas flow fields 120 and 122 can absorb the heat generated from the power generation portion 105.

The above structure according to the present invention can reduce the amount of coolant flowing in the fuel cell. Furthermore, because the temperature distribution over the entire stack can be made uniform, the fuel efficiency can be increased. Accordingly, a compact polymer electrolyte fuel cell with a high power density can be provided.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. A fuel cell comprising:
a membrane electrode assembly;
a bipolar plate configured to guide a reaction gas to the membrane electrode assembly, the bipolar plate including a coolant inlet manifold configured to distribute a coolant and a coolant outlet manifold configured to discharge the coolant;
a first coolant flow field adjacent to the bipolar plate;
a second coolant flow field adjacent to the first coolant flow field; and
a member having permeability or jet orifices so as to allow the coolant to pass through,
wherein the member is disposed between the first and the second coolant flow fields, and
one of the first and the second coolant flow fields is blocked from communicating with the coolant inlet manifold, and the other of the first and the second coolant flow fields is blocked from communicating with the coolant outlet manifold.

2. A fuel cell comprising:
a membrane electrode assembly;
a bipolar plate configured to guide a reaction gas to the membrane electrode assembly, the bipolar plate including a coolant inlet manifold configured to distribute a coolant and a coolant outlet manifold configured to discharge the coolant;
a reaction gas flow field formed on one side of the bipolar plate;
two layers of coolant flow fields formed on the other side of the bipolar plate; and
an interlayer separation plate disposed between said two layers of coolant flow fields,
wherein the interlayer separation plate has permeability or jet orifices so as to allow the coolant to pass through, and one of said two layers of coolant flow fields is blocked from communicating with the coolant inlet manifold, and the other of the first and the second coolant flow fields is blocked from communicating with the coolant outlet manifold.

3. The fuel cell according to claim 2, wherein the interlayer separation plate is made of a dense solid material and has a plurality of jet orifices through which liquid droplets of the coolant are generated.

4. The fuel cell according to claim 2, wherein the interlayer separation plate is made of a porous material through which liquid droplets of the coolant are generated.

5. The fuel cell according to claim 2, wherein the two layers of coolant flow fields comprise a first coolant flow field facing the bipolar plate and a second coolant flow field;
at least vaporized coolant flows along the first coolant flow field; and
pressurized liquid coolant flows along the second coolant flow field.

6. The fuel cell according to claim 2, wherein a seal is disposed between the reaction gas flow field and the two layers of coolant flow fields so as to prevent fluids therein from being mixed.

7. The fuel cell according to claim 5, wherein a part of the reaction gas is supplied to the first coolant flow field so as to assist discharge of the coolant that flows along the first coolant flow field.

8. The fuel cell according to claim 7, wherein the bipolar plate includes a reaction gas outlet manifold configured to discharge reaction gas, and
wherein the reaction gas outlet manifold and the coolant outlet manifold are disposed separately.

9. The fuel cell according to claim 7, wherein the bipolar plate includes an outlet manifold, and wherein the outlet manifold is commonly used as a reaction gas outlet manifold configured to discharge the reaction gas and the coolant outlet manifold configured to discharge the coolant.

10. The fuel cell according to claim 9, wherein a flow direction in which the coolant flows along the second coolant flow field is opposite to a flow direction in which the reaction gas flows along the reaction gas flow field.

11. The fuel cell according to claim 3, wherein the jet orifices are configured to generate the liquid droplets of the coolant having diameters of 30 μm or less.

12. The fuel cell according to claim 4, wherein an average pore diameter of the porous material is about 30 μm.

13. A fuel cell comprising:
a membrane electrode assembly;
a bipolar plate configured to guide a reaction gas to the membrane electrode assembly, the bipolar plate including a coolant inlet manifold configured to distribute a coolant and a coolant outlet manifold configured to discharge the coolant;
a reaction gas flow field formed on one side of the bipolar plate;

two layers of coolant flow fields formed on the other side of the bipolar plate; and an inter layer separation plate disposed between said two layers of coolant flow fields, wherein the interlayer separation plate has permeability or jet orifices so as to allow the coolant to pass through and generate liquid droplets of the coolant, and said two layers of coolant flow fields are sealed and blocked such that the coolant is supplied from the coolant inlet manifold into one of the said two layers of coolant flow fields, the coolant passes through the inter layer separation plate into the other of the said two layers of coolant flow fields, and the coolant is discharged out said coolant outlet manifold.

14. The fuel cell according to claim 13, wherein diameters of the liquid droplets of the coolant are 30 μm or less.

* * * * *